(No Model.) 2 Sheets—Sheet 1.
V. ROYLE.
ATTACHMENT FOR BEVELING MACHINES.

No. 563,886. Patented July 14, 1896.

Witnesses:
Fred Haynes
George Barry Jr.

Inventor:
Vernon Royle,
by attorneys:
Brown & Seward

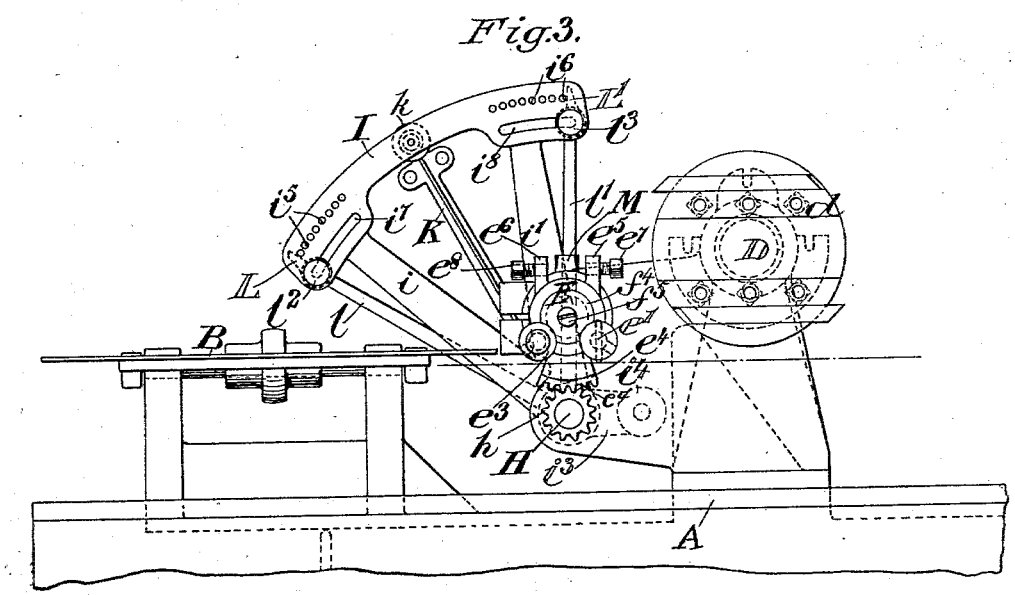

UNITED STATES PATENT OFFICE.

VERNON ROYLE, OF PATERSON, NEW JERSEY.

ATTACHMENT FOR BEVELING-MACHINES.

SPECIFICATION forming part of Letters Patent No. 563,886, dated July 14, 1896.

Application filed April 17, 1896. Serial No. 587,919. (No model.)

*To all whom it may concern:*

Be it known that I, VERNON ROYLE, of Paterson, in the county of Passaic and State of New Jersey, have invented a new and useful Improvement in Attachments for Beveling-Machines, of which the following is a specification.

My invention relates to an improvement in attachments for beveling-machines in which provision is made for providing the face of the plate in proximity to its beveled edge with a raised bead for producing a marginal line around the print, which is to be subsequently taken from the plate. The arrangement is such that the raised bead is formed at the time the edge is beveled, and this arrangement is preferred for the purpose of saving time and of securing accuracy with respect to the location of the bead and beveled edge, but so far as the particular structure and operation of the bead-forming mechanism is concerned it might be employed separate from the beveling device, if so desired.

In the accompanying drawings I have shown only so much of a beveling-machine in connection with the attachment as is considered necessary to a clear disclosure of the operation of the attachment.

Figure 1:
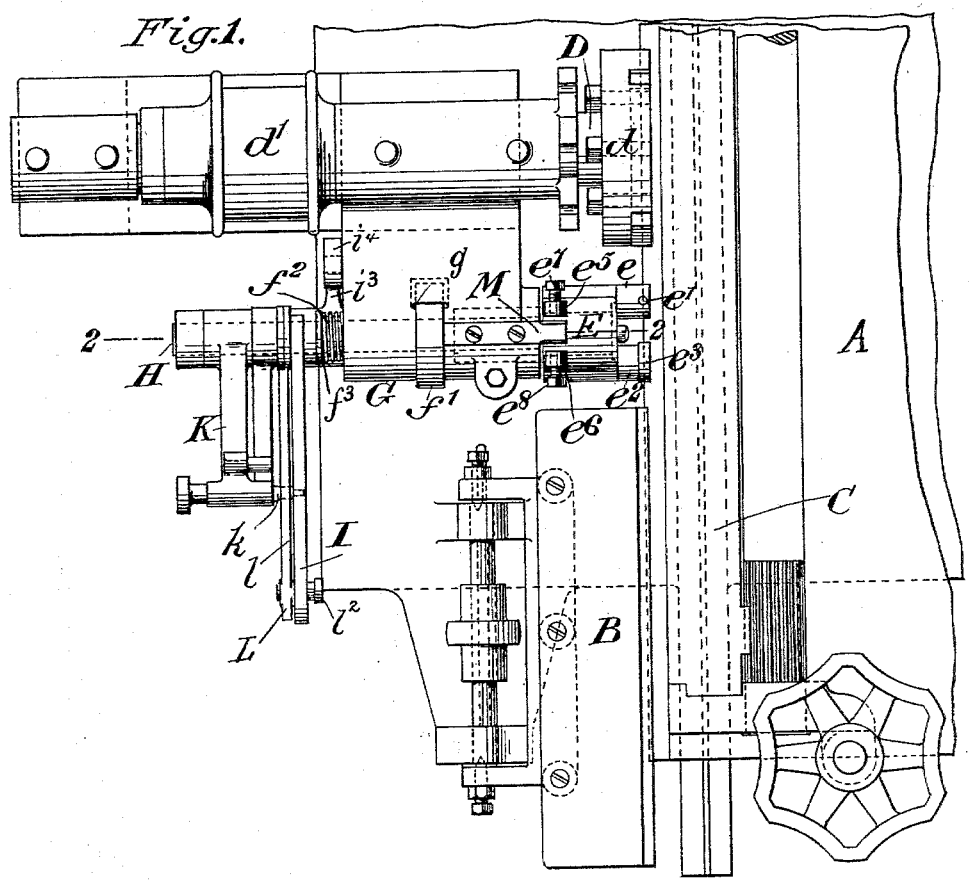
Figure 2:
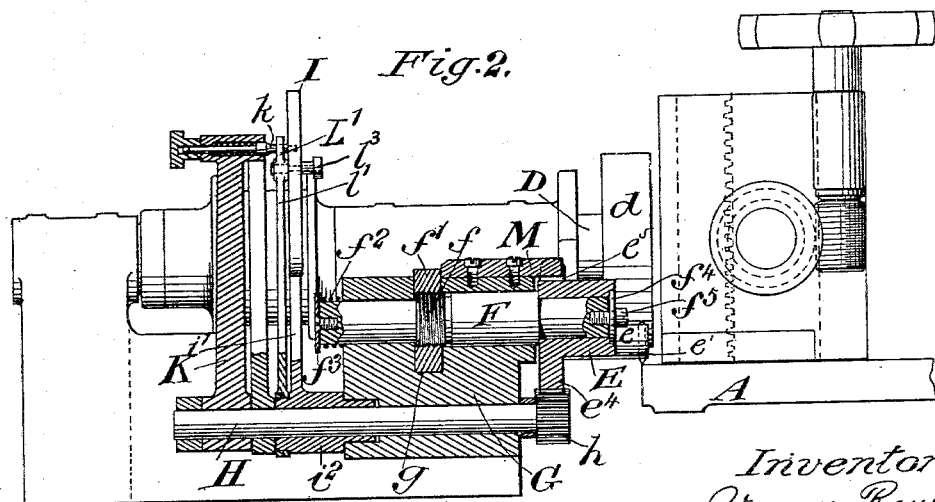

Figure 1 is a top plan view of the attachment and portions of the beveling-machine in the immediate vicinity. Fig. 2 is a transverse vertical section along the plane of line 2 2 of Fig. 1, and Fig. 3 is a view in side elevation looking toward the ends of the cutter and roller-carrying heads which form the bead.

The table which supports the plate to be operated upon is denoted by A, the gage for determining the line of bevel by B, and the clamping-plate, vertically movable with respect to the table A, by C. These parts, together with the spindle D, carrying the cutter-head $d$, and driven by means of a band-pulley $d'$ thereon, from a suitable source of power, (not shown,) may be of any well-known or approved form, such as are at present known in the art.

My present invention contemplates the introduction of a cutter which shall form a slight ridge along the margin of its cut as the plate is advanced to be beveled and a leveling device which shall act upon the apex of the slight ridge formed by the cutter during the backward stroke of the plate, thereby smoothing and flattening the top of the slight ridge, so as to form a true surface raised slightly from the main surface of the printing-plate.

The cutter-supporting head $e$, carrying the cutter $e'$, and the flattener-supporting head $e^2$, carrying the flattening-roller $e^3$, project eccentrically from the end of a rocking head or sleeve E, mounted on the end of a longitudinally-sliding bar F, seated within a rigid support G.

The bar F is provided with a screw-threaded portion $f$ for the reception of an adjusting-nut $f'$, seated within a slot $g$, formed in the support G, so that when the nut $f'$ is turned, it being held against movement longitudinally of the bar F, the latter will be forced longitudinally in its bearings to vary the distance of the cutter and flattener from the edge of the plate. A spring $f^2$, inserted between the end of the support G and a removable cap-plate $f^3$ on the bar F, serves to hold the bar at all times at its farthest point away from the edge of the plate and prevents the adjusting-nut $f'$ from working loose and all tendency of the parts to rattle. The bar F, if made circular, is prevented from rotating by any well-known or approved means, such, for example, as the well-known spline-and-groove connection with its bearing.

The rocking hub E is held in its position on the end of the bar F by means of a cap-plate $f^4$, held in position by a screw $f^5$, tapped into the end of the bar F. The rocking hub E is provided with a toothed segment $e^4$, which is engaged by a pinion $h$ on the end of a rock-shaft H, mounted within the fixed support G.

A sector-bar I is centered on the rock-shaft H by means of a pair of arms $i$ $i'$, which lead from it to a hub $i^2$, and a short arm $i^3$ leads from the hub to a boss $i^4$ on the supporting-frame, where it is fixed to the supporting-frame to hold the sector-bar I firmly in position.

An arm K for rocking the hub E to bring either the cutter or the flattener into operation is fixed to rock with the shaft H and carries at its free end a spring-actuated pin $k$, constructed to enter some one of a series of perforations $i^5$ or some one of a series of perforations $i^6$ upon opposite sides of the center of the sector-bar I to hold the shaft H in its rocked adjustment.

The distance to which the arm K can be thrown in the one direction or the other is determined by a pair of abutments L L', fixed on the free ends of a pair of arms $l$ $l'$, loosely mounted on the hub $i^2$ of the sector-bar I and provided with adjusting-screws $l^2$ $l^3$, which pass through elongated slots $i^7$ $i^8$ in the sector-bar and serve to clamp the abutments L L' in the desired positions to restrict or extend the throw of the operating-arm K.

I further provide a very exact adjustment of the rocking movement of the hub E, carrying the cutter and flattener, by means of a central abutment M, fixed to the top of the support G and projecting between a pair of lugs $e^5$ $e^6$, which lugs are provided with adjusting-screws $e^7$ $e^8$, which, by their adjustment within the lugs $e^5$ and $e^6$, determine the distance which the hub E shall be permitted to rock by their earlier or later engagement with the abutment M.

In operation, the plate to be beveled and beaded having been adjusted in position, the operating-arm K is thrown over in the direction to bring the cutter $e'$ into position to engage the surface of the plate. The plate is then advanced, the cutter $e'$ by its particular shape serving to turn a ridge of metal along one edge of its cut. After the plate has been passed beneath the beveling-cutters it is returned, but before it reaches the flattener carried by the hub E the operating-arm K is thrown over in the opposite direction to lift the cutter $e'$ out of engagement with the plate and bring the flattener $e^3$ down into position to engage and flatten the outer face of the slight ridge of metal formed by the cutter during the advance movement of the plate.

In setting the cutter and the flattener to cut and flatten the desired amount, the adjusting-screws $e^7$ $e^8$ may be utilized, and, when the exact position of the parts has been determined, the abutments L L' on the sector-bar may be brought up into position to arrest the operating-arm K at the proper point to lock the cutter and flattener supporting hub E in the desired positions.

As the plates vary in thickness, the throw of the operating-arm K will be required to be less in order to bring the cutter and the flattener into the desired positions, and hence the adjustment of the abutments L L' is made considerable to account for such variation.

I have described the flattener $e^3$ as a roller, as this is the form which I at present prefer. I may, however, use a stationary piece instead of a rotary piece to effect the necessary flattening of the surface, such variation in structure being obvious, as it would require nothing more than the substitution of a stationary piece in place of the rotary piece $e^3$.

What I claim is—

1. The bead-forming mechanism, comprising a cutter adapted to raise a ridge at the side of its cut, a flattener adapted to flatten the face of the ridge, a plate-holder and means for bringing the cutter and the flattener into engagement with the plate along its surface, substantially as set forth.

2. The bead-forming mechanism, comprising a cutter, a flattener, a rocking support for the cutter and flattener, a reciprocating plate-holder and means for adjusting the said rocking support to bring either the cutter or flattener into engagement with a plate, substantially as set forth.

3. The bead-forming mechanism, comprising a cutter and flattener, a rocking support for the cutter and flattener, a reciprocating plate-holder, means for adjusting the said rocking support in the direction of its axis and means for adjusting the said support in different rocked positions, substantially as set forth.

4. The bead-forming mechanism, comprising a suitable fixed support, a bar mounted in longitudinally-sliding adjustment in the fixed support, a nut engaged with the bar for adjusting it, a rocking hub or sleeve mounted on the bar, a cutter and a flattener mounted on the rocking hub or sleeve, means for rocking the hub or sleeve, means for limiting the rocking movement of the hub or sleeve and a reciprocating plate-holder, substantially as set forth.

5. The bead-forming mechanism, comprising a rocking hub or sleeve, a cutter carried by the said hub or sleeve, a fixed support in proximity to the hub or sleeve, the fixed support and the rocking hub or sleeve being provided the one with a stop and the other with abutments in position to engage the stop as the hub or sleeve is rocked, adjusting-screws seated in the abutments to limit the desired rocking movement of the hub or sleeve and a reciprocating plate-holder, substantially as set forth.

6. The bead-forming mechanism, comprising the rocking cutter-support and cutter, a rock-shaft geared with the cutter-support, a sector-bar, an operating-arm fixed to rock with the rock-shaft, means for locking the operating-arm to the sector-bar to hold the operating-arm and hence the rocking cutter-support in the desired rocked adjustment and a reciprocating plate-holder, substantially as set forth.

7. The bead-forming mechanism, comprising the rocking cutter-support and cutter, a rock-shaft geared with the cutter-support, a sector-bar, adjustable stops on the sector-bar, an operating-arm fixed to rock with the shaft, means for locking the operating-arm to the sector-bar at the limits of its movements between the said stops and a reciprocating plate-holder, substantially as set forth.

8. The combination with the beveling mechanism of a beveling-machine, of bead-forming mechanism comprising a cutter, a flattener and means for bringing them into engagement with a plate as it passes to and from the beveling-cutter, and means for presenting the plate to the beveling and bead-forming mechanisms without removing it from the table, substantially as set forth.

VERNON ROYLE.

Witnesses:
FREDK. HAYNES,
IRENE B. DECKER.